This invention relates to battery charging circuits and, more particularly, to a charging circuit for a battery used to energize remote equipment in a distribution system such as repeating circuit interrupters and the like.

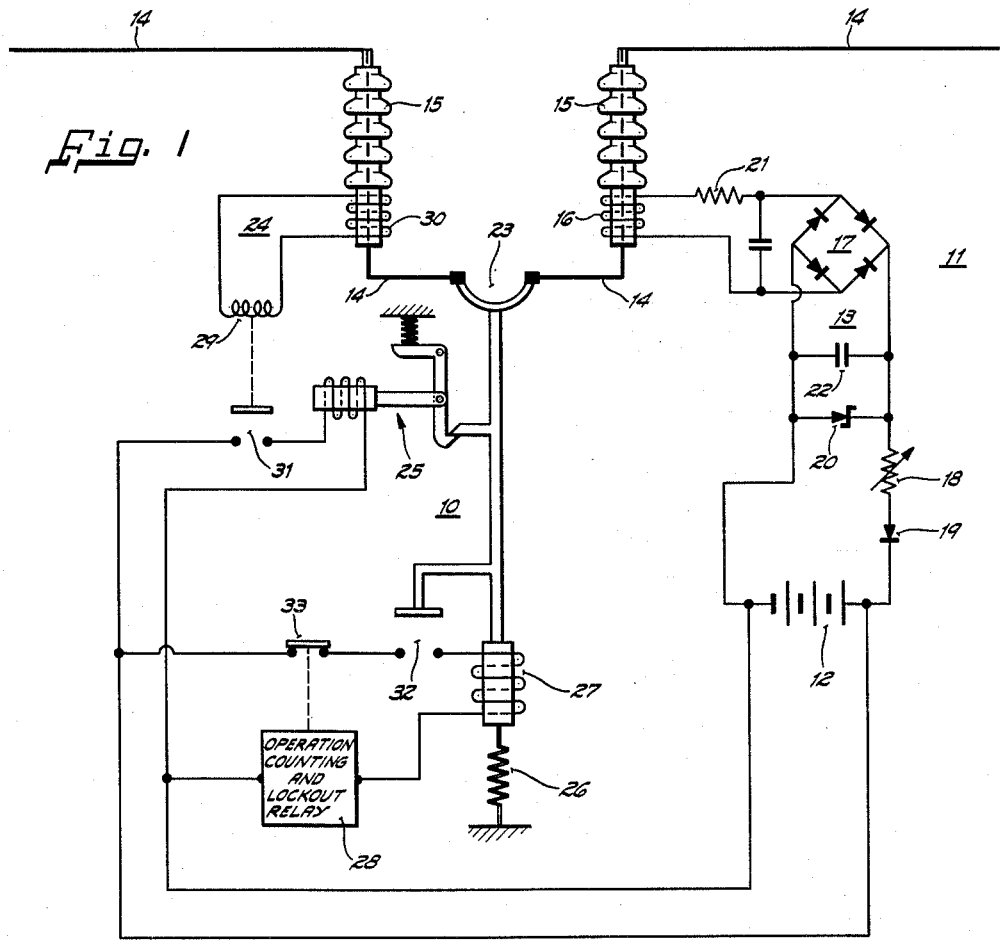
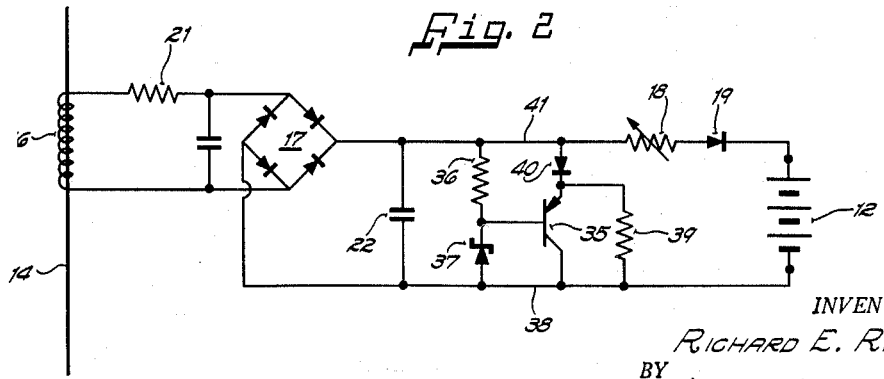
INVENTOR.
RICHARD E. RIEBS
BY Fred Wiviott
ATTORNEY 3,116,439
REPEATING CIRCUIT INTERRUPTER AND
BATTERY CHARGING CIRCUIT USED
THEREWITH
Richard E. Riebs, Hales Corners, Wis., assignor to McGraw-Edison Company, Milwaukee, Wis., a corporation of Delaware
Filed Oct. 27, 1960, Ser. No. 65,353
1 Claim. (Cl. 317—22)

In distribution systems it is often desirable to energize remote protective devices such as reclosers and repeating circuit interrupters from an auxiliary power source rather than directly from the line itself. In this manner, energy is available for the operation of such devices regardless of the presence or absence of energy in the main distribution line. However, because of the remoteness of such devices, it is impractical to energize them from the substation auxiliary power supply. In order for these remote devices to be self-contained, therefore, they must include a battery and compact means for charging it from the power available in the distribution line itself. However, this is complicated by the fact that the energy required to charge the battery is relatively minute with respect to the power available in the distribution line. For example, such distribution lines may be energized by voltages ranging from 5,000 to 69,000 volts while the battery voltage is in the range of 25 volts.

Some prior art battery charging circuits utilized potential transformers for coupling the charging circuit to the distribution line. Such transformers are connected from line to ground so that they require line-to-ground insulation. As a result, such charging circuits were unsuitable for energizing the power supply of a remote repeating circuit interrupter because potential transformers suitable for this purpose would be almost as large and as costly as the circuit interrupter itself.

The charging of a circuit interrupter power supply battery from the distribution line is further complicated by the fact that the load current in the line varies through a wide range of values.

It is an object of the invention to provide a circuit for charging a battery from an electrical distribution line wherein a relatively steady flow of charging current is maintained to the battery regardless of the value of the line current.

Another object of the invention is to provide a battery charging circuit with relatively inexpensive means for coupling a low voltage battery to a high voltage distribution line.

It is another object of the invention to provide a circuit for charging a battery from a transmission line wherein the current flowing to the battery is held to a predetermined value.

A further object of the invention is to provide a circuit for charging a battery from a transmission line by deriving current from the normal load current flowing in the system wherein the charging current is relatively stable for wide ranges of system current.

Another object of the invention is to provide a circuit employing a current transformer for charging a battery from a high voltage distribution line.

These and other objects and advantages of the invention will become more apparent from the detailed description of the invention taken with the accompanying drawing in which:

FIG. 1 shows a preferred embodiment of the invention; and

FIG. 2 shows an alternate embodiment of the instant invention.

In general terms, the invention comprises a power supply unit for a remotely located protective device in an alternating current distribution line including a current transformer coupled to the distribution line, rectifier means connected to the secondary of the current transformer, a battery connected to the output terminals of the rectifier, and circuit means connected to the battery and operable to become conductive and shunt excess charging current around the battery so that the current flowing thereto is held to a predetermined value.

Referring now to the drawing in greater detail, the schematically illustrated repeating circuit interrupter, shown in FIG. 1, is generally designated by the numeral 10 and its integral power supply unit by the numeral 11. The power supply unit 11 includes a battery 12 and a charging circuit 13 which couples battery 12 to distribution line 14 for charging. Circuit interrupter 10 is connected to the line 14 through high voltage bushings 15 and the battery charging circuit 13 is coupled to the line 14 by means of a current transformer 16 whose secondary winding consists of a coil of wires surrounding the base of one of the bushings 15. In this manner, the relatively low voltage battery is connected to the high voltage distribution line without the necessity of additional costly insulation since the bushing itself supplies all the insulation that is required.

The input terminals of a bridge type rectifier 17 are connected to the secondary winding of current transformer 16 while its output terminals are connected to the battery charging circuit 13. A resistor 18 and a diode 19 are connected in series with the positive terminal of battery 12. In addition, a Zener diode 20 is connected in parallel with the series combination of battery 12, diode 19 and resistor 18. Also, a current limiting resistor 21 is connected in the secondary circuit of current transformer 16 and a filter capacitor 22 shunts the output terminals of rectifier 17.

The schematically illustrated repeating circuit interrupter 10 includes main interrupting contacts 23 in series with the distribution line 14 being protected, over-current sensing means 24, trip means 25, an opening spring 26, a reclosing solenoid 27 and operation counting and lockout means 28.

The overcurrent sensing means 24 includes an overcurrent relay 29 coupled to transmission line 14 by a current transformer 30 and operable, after a time delay, and upon the occurrence of an overcurrent to close normally open contacts 31 and thereby connect the tripping solenoid 25 to the battery 12 whereupon main contacts 23 will be released for movement toward their open position under the influence of opening spring 26. When the main switch 23 reaches its fully open position, normally open contacts 32 will close to place reclosing solenoid 27 in circuit with the battery 12 whereupon the main contacts 23 will be reclosed. Should the fault persist after a predetermined number of such opening and reclosing operations, the operation counting and lockout relay 28, which is in circuit with the reclosing solenoid 27, will open the normally closed contacts 33 and thereby prevent the further reclosure of main switch 23 until contacts 33 are manually reclosed.

The specific components of the repeating circuit interrupter 10 are well known in the art and form no part of the instant invention and accordingly are merely schematically illustrated for the sake of brevity. An example of a recloser with which the power supply circuit 11 is usable is described in copending application Serial Number 800,567, filed March 19, 1959, and assigned to the assignee of the instant invention.

Under normal operating conditions, load current flows in distribution line 14 inducing a current in the secondary winding of current transformer 16 which is rectified by full wave rectifier 17. This rectified current then flows through resistor 18, diode 19, and to the battery 12. Diode 19 prevents the battery from discharging through the charging circuit should the distribution line 14 become de-energized so that the flow of charging current ceases.

Resistor 18 and Zener diode 20 perform the function of holding the flow of charging current to battery 12 to a predetermined value. Resistor 18 is adjusted so that when the current in distribution line 14 exceeds a minimum predetermined value, its IR drop plus the voltage of battery 12 will exceed the breakdown potential of Zener diode 20 whereby the latter will begin conducting. As a result, the excess current will be shunted through Zener diode 20 rather than flowing through the battery 12. Thus, the current flowing through the battery 12 is held to a predetermined value.

In the event that an overload current occurs in distribution line 14, the limiting resistor 21 is provided to produce a large burden voltage on the secondary of current transformer 16. This burden voltage will cause current transformer 16 to saturate thereby limiting the amount of current that will be supplied to the remainder of the circuit. As a result, the current flowing through rectifier 17 is limited to a value that can safely be bypassed by Zener diode 20.

It will be appreciated that because the current transformer 16 is connected "in the line" rather than across the line as in the case of a potential transformer, no costly and bulky insulation is required. In addition, because the current transformer comprises merely a coil of wire around the line wire, the recloser's normal insulation can be employed to insulate it from ground instead of the additional phase to ground insulation required of a potential transformer.

FIG. 2 shows an alternate embodiment of the instant invention in which the Zener diode of FIG. 1 has been replaced by a circuit including transistor 35 whose collector is connected to the negative battery 12 terminal. The base of transistor 35 is connected to the junction between the series combination of a resistor 36 and a Zener diode 37 which are connected across the output terminals of rectifier 17. Because the voltage across Zener diode 37 is constant regardless of the current flowing to the charging circuit, the base potential of transistor 35 will be constant relative to the negative conductor 38. A resistor 39 connects the emitter of transistor 35 to negative conductor 38 while diode 40 connects it to the positive conductor 41. As a result the emitter potential of transistor 35 will vary relative to conductor 38 with variations in the charging current flowing therein. As a result, therefore the various circuit components can be so chosen that when the battery charging current exceeds a predetermined value the emitter potential of transistor 35 will exceed its base potential and it will begin conducting. In this manner, any charging current in excess of that required for battery 12 will be shunted by the emitter-collector circuit of transistor 35. The charging circuit of FIG. 2 would be used in those situations where the amount of energy required to be dissipated in the bypass circuit exceeds the rating of a Zener diode alone as shown in FIG. 1.

While only a few embodiments of the invention have been shown and described, it is intended to cover in the appended claim all modifications that fall within the scope of the invention.

I claim:

A repeating circuit interrupter having switch means for interrupting an electrical system, electroresponsive switch opening means for opening said switch means upon the occurrence of an overcurrent in said system, electroresponsive means for effecting the reclosure of said switch means after an opening operation thereof, electric power supply means for said electroresponsive switch opening and reclosing means including a current transformer coupled to said system, fullwave rectifier means having an input connected to said current transformer and an output, resistance means connected in series circuit relation between said current transformer and said rectifying means, a battery connected to the output of said rectifier means and adapted to be charged by the rectified current flowing therefrom, a resistor in series with said battery, and a Zener diode connected in shunt with the series combination of said battery and said resistor.

References Cited in the file of this patent
UNITED STATES PATENTS

| 1,772,508 | Bascom | Aug. 12, 1930 |
| 1,837,738 | Veucill | Dec. 22, 1931 |
| 2,088,409 | Dozler | July 27, 1937 |
| 2,210,669 | Johnson | Aug. 6, 1940 |

OTHER REFERENCES

Lowry: "Transistorized Regulated Power Supplies," Electronic Design, February 15, 1956, page 38.